(12) United States Patent
Domani et al.

(10) Patent No.: US 10,947,788 B2
(45) Date of Patent: Mar. 16, 2021

(54) DRILL BIT

(71) Applicant: Hilti Aktiengesellschaft, Schaan (LI)

(72) Inventors: Guenter Domani, Weissenberg (DE); Bastian Pluemacher, Schwabmuenchen (DE); Roland Foser, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 189 days.

(21) Appl. No.: 16/095,174

(22) PCT Filed: Apr. 19, 2017

(86) PCT No.: PCT/EP2017/059220
§ 371 (c)(1),
(2) Date: Oct. 19, 2018

(87) PCT Pub. No.: WO2017/182487
PCT Pub. Date: Oct. 26, 2017

(65) Prior Publication Data
US 2020/0122244 A1    Apr. 23, 2020

(30) Foreign Application Priority Data
Apr. 21, 2016 (EP) .................................... 16166311

(51) Int. Cl.
*E21B 10/44* (2006.01)
(52) U.S. Cl.
CPC .................. *E21B 10/445* (2013.01)
(58) Field of Classification Search
CPC .......... E21B 10/44; E21B 10/36; E21B 10/40; E21B 10/58; E21B 10/445; E21B 10/26
See application file for complete search history.

(56) References Cited

U.S. PATENT DOCUMENTS

| 2005/0100419 A1* | 5/2005 | Stokey | B23B 51/0009 |
| | | | 408/227 |
| 2013/0319774 A1* | 12/2013 | Hammer | B23B 51/02 |
| | | | 175/394 |
| 2016/0375500 A1* | 12/2016 | Kaye, Jr. | B28D 1/146 |
| | | | 408/230 |

FOREIGN PATENT DOCUMENTS

| CN | 2792664 Y | 7/2006 |
| CN | 201455364 U | 5/2010 |

(Continued)

OTHER PUBLICATIONS

International Search Report of PCT/EP2017/059220, dated Jun. 26, 2017.

*Primary Examiner* — David Carroll
(74) *Attorney, Agent, or Firm* — Davidson, Davidson & Kappel, LLC

(57) ABSTRACT

A drill bit that serves to remove mineral materials and that consecutively has on a longitudinal axis (6) a drill head (2), a helix (3), an insertion end (4) and an impact surface (7) on the end face of the insertion end (4) that faces away from the drill head (2) and that serves to absorb impact along a direction of impact (8), is provided. The drill head (2) has at least two cutting edges (13) and at least two blades (20). The cutting edges (13) each have a cutting face (16) and a free face (17). The blades (20) run parallel to the longitudinal axis (6) and adjoin the cutting edges (13). The blades (20) each have a radially projecting tooth (24) that adjoins the cutting face (16), whereas it adjoins the free face (17) either only partially or not at all. The axial dimension (29) of the tooth (24) is smaller than the axial dimension (25) of the blade (20).

15 Claims, 3 Drawing Sheets

(56) References Cited

FOREIGN PATENT DOCUMENTS

| | | | |
|---|---|---|---|
| DE | 102014200363 A1 | 7/2015 |
| EP | 1 616 649 A1 | 1/2006 |
| EP | 1985794 A2 | 10/2008 |
| EP | 2192302 A1 | 6/2010 |
| EP | 2669033 A1 | 12/2013 |

* cited by examiner

DRILL BIT

The present invention relates to a drill bit to remove mineral materials by means of chiseling.

BACKGROUND

A drill bit to remove mineral materials by means of chiseling is disclosed in European patent specification EP 2192302 B1. The drill head has four arms with a cruciform arrangement. The arms form cutting edges facing in the direction of impact as well as a central tip. The arms have a prismatic shape.

SUMMARY OF THE INVENTION

The present invention provides a drill bit that serves to remove mineral materials by means of chiseling consecutively and has on a longitudinal axis a drill head, a helix, an insertion end and an impact surface on the end face of the insertion end that faces away from the drill head and that serves to absorb impact along a direction of impact. The drill head has at least two cutting edges and at least two blades. The cutting edges each have a cutting face and a free face. The blades run parallel to the longitudinal axis and adjoin the cutting edges. The blades each have a radially projecting tooth that adjoins the cutting face, whereas it adjoins the free face either only partially or not at all. The axial dimension of the tooth is smaller than the axial dimension of the blade.

The tooth reduces the contact surface of the drill head with the wall of the drilled hole as soon as the wall of the drilled hole has been scraped clean. The height of the tooth, which is smaller than that of the drill head or of the lateral blades, has proven to be sufficient to nevertheless create a drilled hole that is sufficiently circular.

One embodiment provides for the blades to have a free face that is arranged in front of the tooth in the direction of impact and behind the tooth in the direction of rotation, whereby the radial distance of the free face to the longitudinal axis is smaller than the radial distance of the tooth to the longitudinal axis. The drill head does not simply have a smaller height but it also continues underneath the tooth. The greater height serves to enhance the mechanical stability of the drill head. The tooth can have a cylindrical outer surface that can advantageously run flush along the wall of the drilled hole.

One embodiment of the invention provides for the tooth to have a removal groove. In this manner, the tooth forms the front part of the blade in the direction of rotation.

The axial dimension of the tooth can amount to between 50% and 80% of the axial dimension of the blade. The tooth has a substantial dimension but it is nevertheless considerably smaller than the blade.

One embodiment provides for at least two cutting edges of the drill bit to be monolithically joined to two additional cutting edges. The drill bit can have, for instance, four of the above-mentioned cutting edges or, for example, two of the cutting edges, as the main cutting edges, and additionally two secondary cutting edges. The two additional cutting edges can have smaller radial dimensions than the at least two cutting edges. A continuously prismatic or cylindrical secondary blade that is parallel to the longitudinal axis is configured adjacent to each of the two additional cutting edges.

BRIEF DESCRIPTION OF THE DRAWINGS

The description below explains the invention on the basis of embodiments and figures provided by way of an example. The figures show the following.

DETAILED DESCRIPTION

Figure 1:
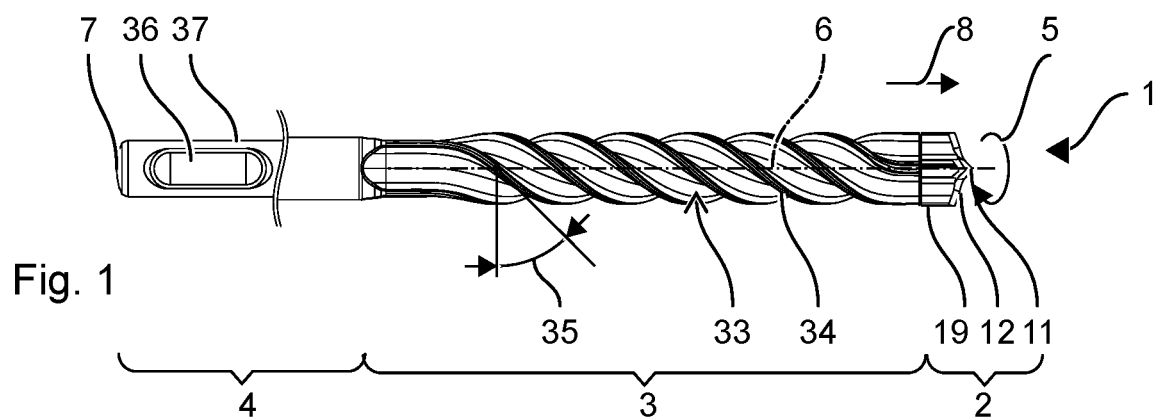
FIG. 1: a drill bit.
Figure 2:
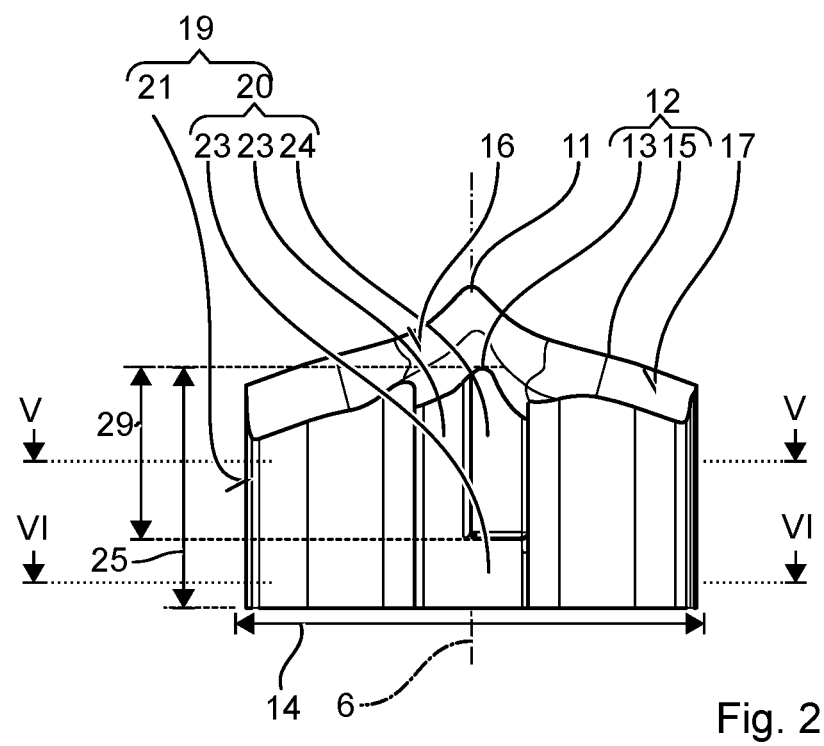
FIG. 2: a drill bit in a side view.
Figure 3:
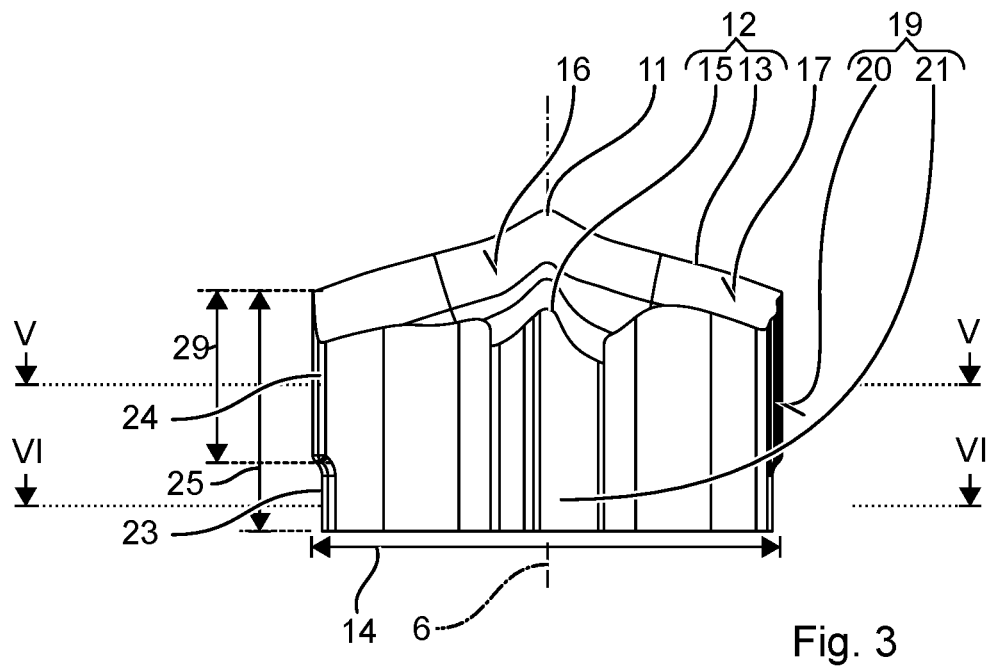
FIG. 3: the drill head in a side view, rotated by 90° relative to FIG. 2.

Unless otherwise indicated, identical or functionally equivalent elements are designated in the figures by the same reference numerals.

Embodiments of the Invention

FIG. 1 shows a drill bit 1 by way of an example. The drill bit 1 has a drill head 2, a helix 3 and an insertion end 4. The drill bit 1 is configured to remove mineral materials, particularly for the demolition of reinforced concrete. During operation, the drill bit 1 is rotated around its longitudinal axis 6 (axis of the drill bit) in a direction of rotation 5. For this purpose, the drill bit 1 can be inserted into a hand-held power tool that has an appropriate rotary drive. A striking mechanism of the hand-held power tool periodically strikes an impact surface 7 on the exposed end face of the insertion end 4. The shock wave of the impact travels through the helix 3 in the direction of impact 8 to the drill head 2. The drill head 2 shatters the material. For one thing, the rotational movement ensures that the drill head 2 strikes the substrate at various orientations, thereby drilling the hole uniformly, and secondly, it causes the drill cuttings to be removed from the drilled hole via the (transport) helix 3.

The drill head 2 provided by way of an example has four arms 9 arranged in a cruciform manner around the longitudinal axis 6. The adjacent arms 9 are each situated in the direction of rotation 5 of the drill bit 1 at a distance from each other by an angle 10 of between 60° and 120°. In the drill head 2 provided by way of an example, the angles 10 are approximately identically 90°. This example describes the drill head 2 with the preferred number of four arms but the drill head 2 can also be configured with three, five or six arms.

The drill head 2 is preferably made of a sintered material, especially tungsten carbide. The drill head 2 is preferably monolithic, that is to say, the arms 9 are joined together without a joining zone, particularly without a weld seam, solder seam or screwed connection.

The drill head 2 has a tip 11 that forms the highest or outermost point of the drill bit 1 in the direction of impact 8. The tip 11 first makes contact with the material during drilling. The drill head 2 provided by way of an example has four cutting edges 12. The cutting edges 12 are the areas of the arms 9 facing in the direction of impact 8. The cutting edges 12 are driven into the mineral material in a chiseling manner, as a result of which the brittle material breaks locally. The cutting edges 12 run essentially in the radial direction. The cutting edges 12 have a cruciform arrangement. In the direction of rotation 5, the adjacent cutting edges 12 are each situated at a distance from each other by an angle of between 60° and 120°. In the embodiment provided by way of an example, the angles 10 are approximately identically 90°.

Two main cutting edges 13 of the cutting edges 12 start at a radial edge of the drill head 2 and meet at the tip 11 of the drill head 2. The main cutting edges 13 preferably rise continuously from an edge all the way to the tip 11 along the direction of impact 8. The diameter 14 of the drill head 2 can correspond to twice the radial dimension of the main cutting edges. Two secondary cutting edges 15 of the cutting edges 12 start at a radial edge of the drill head 2 and they end at a radial distance in front of the tip 11. The secondary cutting edges 15 can rise from a radial edge all the way to the tip 11, likewise in the direction of impact 8, or else they remain at a constant height. The main cutting edges 13 and the secondary cutting edges 15 are arranged alternatingly in the direction of rotation 5.

The cutting edges 12 are each formed by a cutting face 16 and a free face 17. The cutting face 16 is situated ahead of the free face 17 as seen in the direction of rotation 5 of the drill bit 1. The cutting face 16 rises continuously along the direction of rotation 5 of the drill bit 1 in the direction of impact 8. The free face 17 drops continuously along the direction of rotation 5 of the drill bit 1 in the direction of impact 8. The cutting face 16 and the free face 17 are slanted towards each other. The roof pitch angle between the cutting face 16 and the free face 17 is greater than 45°, preferably greater than 60° and smaller than 120°. The cutting face 16 and the free face 17 adjoin each other at a chiseling edge 18.

The drill head 2 has four blades 19 that run parallel to the drill bit axis 6. The blades 19 are in contact with the wall of the drilled hole. As the drill bit 1 rotates in the direction of rotation 5, the blades 19 break off projections that protrude from the wall of the drilled hole relative to the drill bit axis 6. The blades 20 are the radially outer surfaces or areas of the arms 9. The radially outer edge of the drill head 2 is formed by the blades 19. The blades 19 run at a radial distance to the longitudinal axis 6, said distance corresponding to about half the diameter of the drill head 2. The blades 19 adjoin the radial edge of the cutting edges 12.

The main blades 20 of the blades 19 adjoining the main cutting edges 13 can be configured so as to differ from the secondary blades 21 adjoining the secondary cutting edges 15. In particular, the secondary blades 21 can have a smaller radial dimension 22 in comparison to the main blades 20.

The main blades 20 have a free face 23 and a tooth 24. The free face 23 is configured so as to be cylindrical or prismatic. The prismatic shape approximates a cylindrical shape. The radius of the free face 23 corresponds to the radial distance to the longitudinal axis 6. The free face 23 extends over the entire height 25 of the main blade 20. The free face 23 is situated parallel to the longitudinal axis 6. The tooth 24 projects forward relative to the free face 23 as seen in the radial direction. In the case of a cylindrical drilled hole that has been scraped clean, the tooth 24 of the main blade 20 is only in contact with the wall of the drilled hole. The tooth 24 preferably has a cylindrical outer surface 26 whose radius to the longitudinal axis 6 corresponds to half of the drill bit diameter 14. The radius of the free face 23 can correspond to the radius of the secondary cutting edges 15. The outer surface 26 is offset, for example, by between 0.2 mm and 1.0 mm vis-à-vis the free face 23.

The tooth 24 covers a small section of the main blade 20 that adjoins the cutting face 16 of the main cutting edge 13. The tooth 24 preferably does not adjoin the free face 17 of the main cutting edge 13. The width 27 of the tooth 24 is less than the width 28 of the main blade 20, for example, less than half the width 28 of the main blade 20. The height 29 of the tooth 24 is less than the height 25 of the main blade 20, for example, the height 29 of the tooth 24 is in the range between 50% and 80% of the height 25 of the main blade 20. The width designates the dimension in the direction of rotation 5, that is to say, in the circumferential direction. The height designates the axial dimension, that is to say, the dimension parallel to the longitudinal axis 6.

The secondary blades 21 have a cutting face 30 and a free face 31. The cutting face 16 is situated ahead of the free face 17 in the direction of rotation 5. The free face 31 is an essentially convex, cylindrical face whose radius is the same as the radial distance to the longitudinal axis 6. The free face 31 is retracted with respect to the cutting face 30 in the radial direction. For instance, the radial distance of the free face 31 decreases towards the longitudinal axis 6 along the direction of rotation 5. The free face 31 can be, for instance, planar. The cutting face 30 of the secondary blade 21 adjoins the cutting face 16 of the secondary cutting edge, but it does not adjoin the free face 17 of the secondary cutting edge 15. The free face 31 of the secondary blade 21 adjoins the free face 17 of the secondary cutting edge 15, but it does not adjoin the cutting face 16 of the secondary cutting edge 15. The cutting face 30 and the free face 31 run over their entire height 25 parallel to the longitudinal axis 6. The body delimited by the cutting face 30 and the free face 31 is prismatic. The secondary blades 21 are preferably radially offset inwards vis-à-vis the main blades 20. Accordingly, in the case of a cylindrical drilled hole that has been scraped clean, the main blades 20 of the drill head 2 are in contact with the wall of the drilled hole, whereas the secondary blades 21 are at a distance from the wall of the drilled hole with a small amount of play, e.g. 0.2 mm to 0.5 mm.

Figure 4:
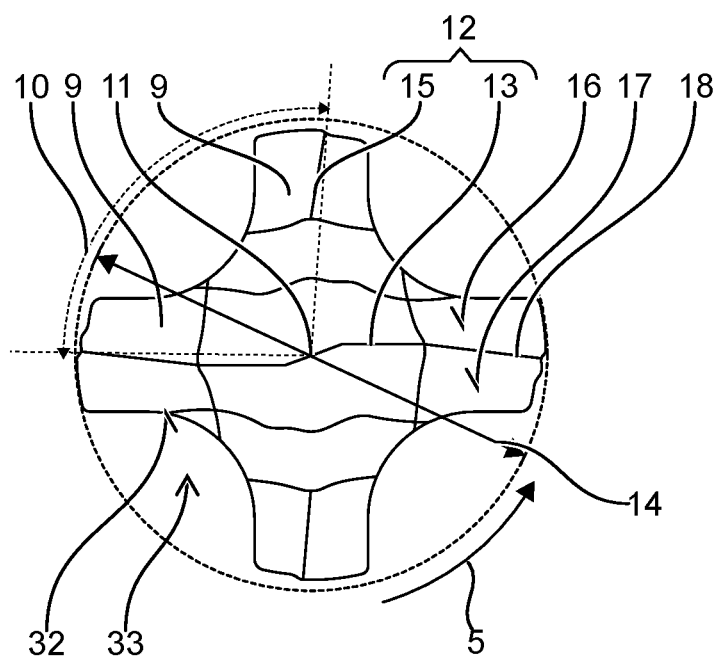
FIG. 4: the drill head in a top view.
Figure 5:
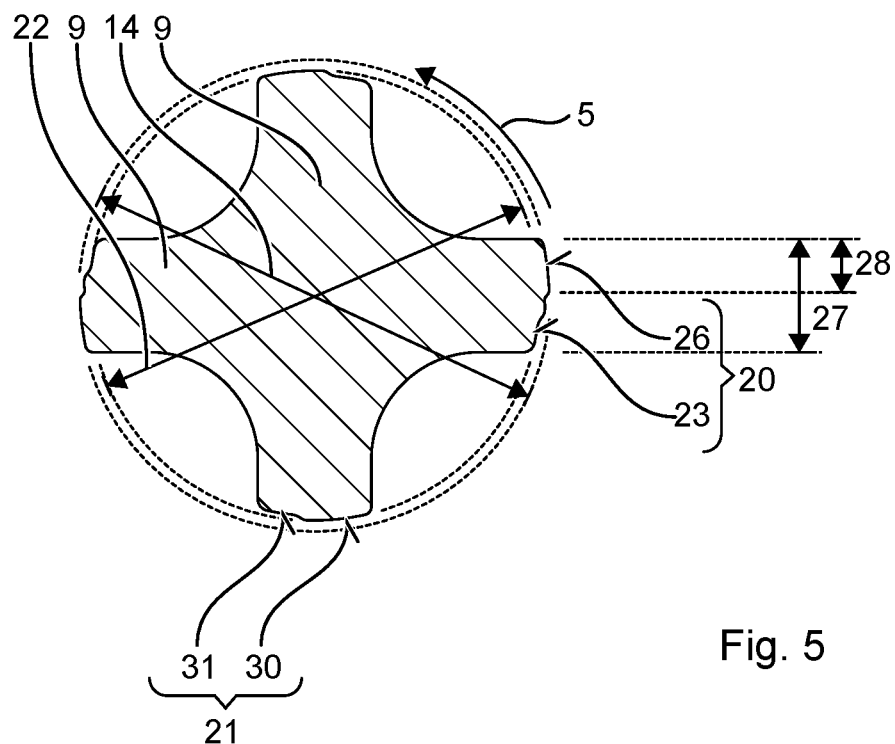
FIG. 5: a cross section through the drill bit in the IV-IV plane.
Figure 6:
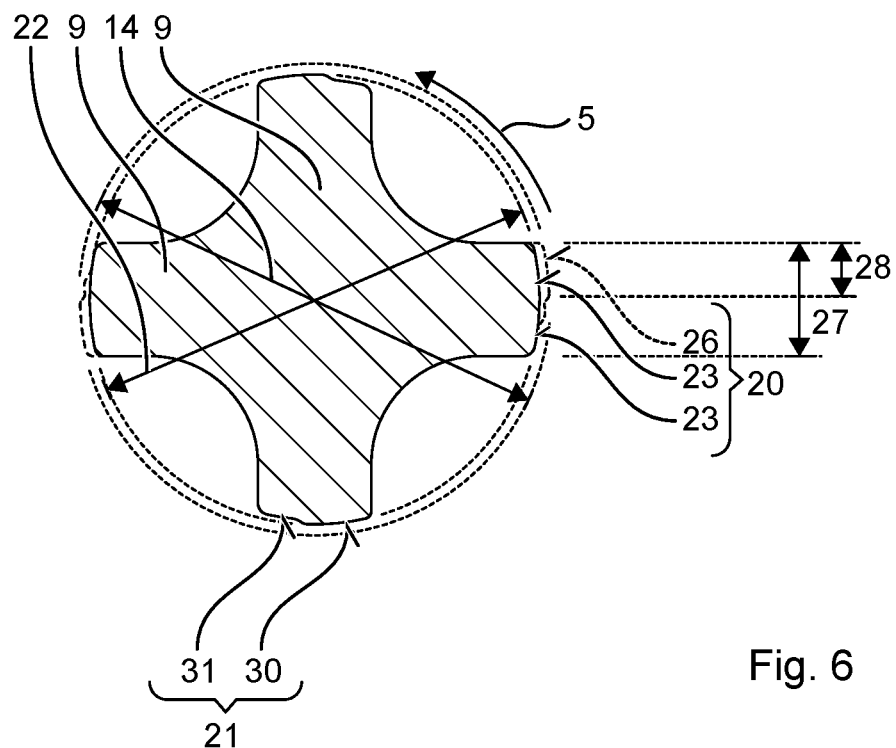
FIG. 6: a cross section through the drill bit in the V-V plane.

The drill head 2 has inner surfaces 32 (see FIG. 4) that are radially offset inwards vis-à-vis the blades 19 and that run largely parallel to the longitudinal axis 6. The inner surfaces 32 form removal grooves for the drill cuttings. The inner surfaces 32 are preferably curved concavely. The inner surfaces 32 make a transition into helical grooves 33 of the helix 3 and convey the drill cuttings away from the drill head 2 (see FIG. 1). The tooth 24 preferably adjoins the removal groove, that is to say, the concave inner surface 32.

The helix 3 of the drill bit 1 has, for example, four helical lands 34. The number of helical lands 34 is preferably the same as the number of cutting edges 12. The helical lands 34 run along the drill bit axis 6 several times around said drill bit axis 6. As the drill bit 1 rotates, the helical lands 34 describe a cylindrical envelope whose diameter corresponds to the diameter of one helix. Adjacent helical lands 34 enclose between themselves a helical groove 33 that is seen as being geometrically delimited by the envelope in the radial direction. The drill cuttings are transported in the helical grooves 33 through the helical lands 34 along the drill bit axis 6. The helical pitch 35 is preferably within the range from 35° to 60°, for instance, 45°.

The insertion end 4 of the drill bit 1 shown by way of an example is designed for the use of drill-chiseling hand-held power tools. The insertion end 4 has an essentially cylindrical shape. The insertion end 4 has two closed grooves 36 into which locking elements of the hand-held power tool engage radially and can slide along the drill bit axis 6. Flutes 37 oriented along the drill bit axis 6 allow the hand-held power tool to apply a torque.

Instead of having differently configured main cutting edges 13 and secondary cutting edges 15, the drill bit 1 can also be configured with four main cutting edges 13 and correspondingly with four main blades 20. Moreover, the secondary cutting edges 15 can define the diameter of the drill head 2 in that the secondary cutting edges 15 project beyond the main cutting edges 13 in the radial direction. In this case, the secondary cutting edges 15 are provided with the main blades 20.

What is claimed is:

1. A drill bit serving to remove mineral materials, the drill bit consecutively on a longitudinal axis comprising:

a drill head;

a helix; and an insertion end, an impact surface on an end face of the insertion end facing away from the drill head, the impact surface serving to absorb impact along a direction of impact;

the drill head having at least two cutting edges and at least two blades, the cutting edges each have a cutting face and a free face and the blades running parallel to the longitudinal axis and adjoining the cutting edges, the blades each have a radially projecting tooth adjoining the cutting face, the radially projecting tooth not adjoining the free face, and an axial dimension of the tooth being smaller than a blade axial dimension of the blade.

2. The drill bit as recited in claim 1 wherein the blades have a blade free face arranged in front of the tooth in the direction of impact and in front of the tooth in the direction of rotation, a radial distance of the blade free face to the longitudinal axis being smaller than a tooth radial distance of the tooth to the longitudinal axis.

3. The drill bit as recited in claim 2 wherein the blade free face is configured so as to have a partially cylindrical surface.

4. The drill bit as recited in claim 1 wherein the tooth has a partially cylindrical outer surface.

5. The drill bit as recited in claim 4 where a radius of the partially cylindrical outer surface is the same as a radial distance to the longitudinal axis of the drill bit.

6. The drill bit as recited in claim 1 wherein the tooth adjoins a concave inner surface defining a removal groove for drill cuttings.

7. The drill bit as recited in claim 1 wherein that the axial dimension of the tooth amounts to between 50% and 80% of the blade axial dimension.

8. The drill bit as recited in claim 1 wherein the at least two cutting edges are monolithically joined to two additional cutting edges.

9. The drill bit as recited in claim 8 wherein the two additional cutting edges have smaller radial dimensions than the at least two cutting edges, and a continuously prismatic or cylindrical secondary cutting blade to the longitudinal axis is configured adjacent to each of the two additional cutting edges.

10. The drill bit as recited in claim 1 wherein the drill head is made of sintered metal carbide and the helix is made of steel.

11. The drill bit as recited in claim 6 wherein the removal groove transitions into a helical groove of the helix.

12. The drill bit as recited in claim 1 wherein the helix has a plurality of helical grooves.

13. The drill bit as recited in claim 1 wherein the drill head as two secondary cutting edges, a radius of the free face corresponding to a radius of the secondary cutting edges.

14. The drill bit as recited in claim 13 wherein the tooth has an outer surface offset radially between 0.2 mm and 1.0 mm vis-à-vis the free face.

15. The drill bit as recited in claim 1 wherein a height of the tooth is in a range between 50% and 80% of a height of the blade.

* * * * *